May 22, 1973
D. L. BLECHA
3,734,994
TWO-STAGE UNIAXIAL ORIENTATION OF POLYETHYLENE
TEREPHTHALATE FILMS
Filed Feb. 9, 1971
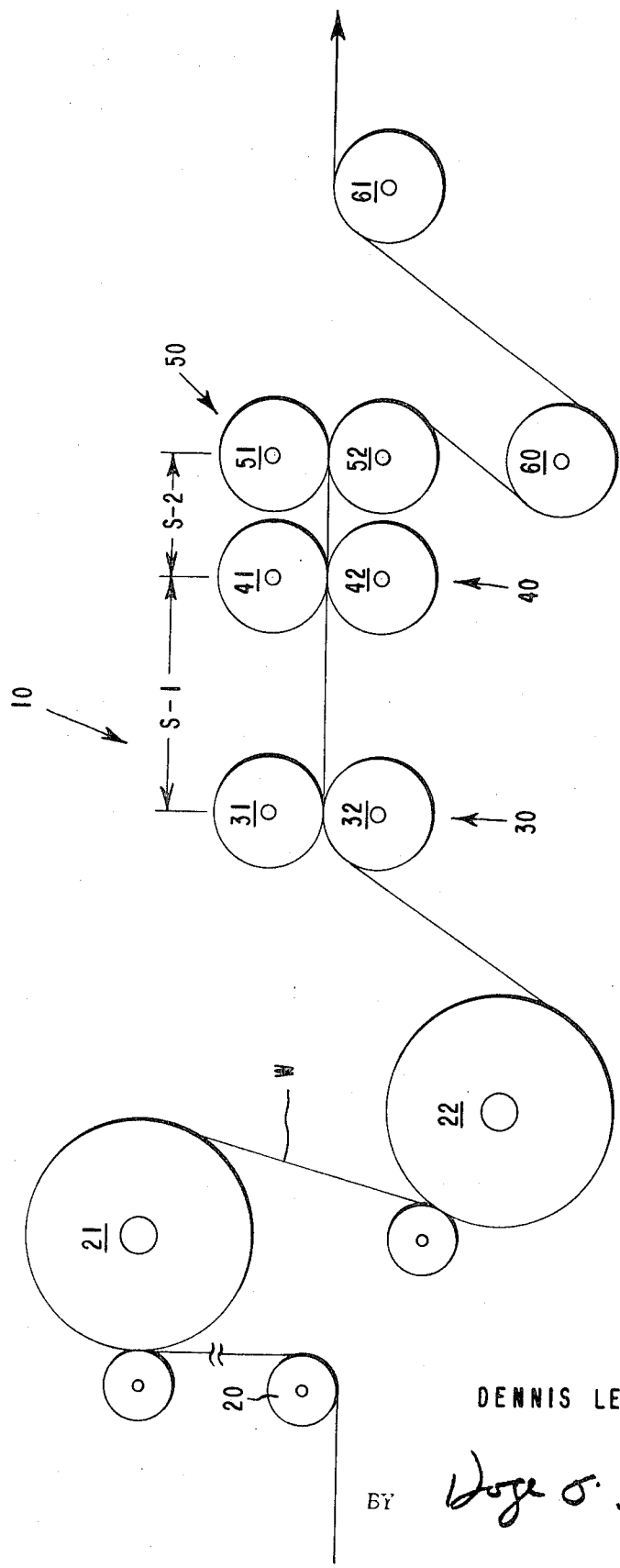
INVENTOR
DENNIS LEONARD BLECHA
BY *Hoge J. Sutherland*
ATTORNEY United States Patent Office 3,734,994
Patented May 22, 1973

3,734,994
TWO-STAGE UNIAXIAL ORIENTATION OF POLY-
ETHYLENE TEREPHTHALATE FILMS
Dennis Leonard Blecha, Circleville, Ohio, assignor to
E. I. du Pont de Nemours and Company, Wilmington,
Del.
Filed Feb. 9, 1971, Ser. No. 113,850
Int. Cl. B29d 7/24
U.S. Cl. 264—288                                    4 Claims

ABSTRACT OF THE DISCLOSURE

A method of orienting a web of thermoplastic polymeric film (i.e., polyethylene terephthalate film) by stretching it in two stages in making film having high birefringence. A web of substantially amorphous film is heated to a first stretching temperature by first heating means and stretched in a first stretching span between first and second sets of nip rolls of a first stretching means. The first stretching temperature to which the web is heated is from 72° to 86° C. whereby, upon first stretching, cold stretching does not occur. Then, this stretched film is heated, from 91° to 102° C., by second heating means to a second stretching temperature and stretched again in a second stretching span, whose length is less than the length of the first stretching span, between second and third sets of nip rolls of a second stretching means whereby to a make a film having improved birefringence properties.

BACKGROUND OF THE INVENTION

(1) Field of the invention

This invention is a method of and apparatus for stretching or drawing polymeric film to orient it.

In particular, such invention is a novel method of and apparatus for orienting film by first stretching a web of substantially amorphous film of a linear polyester in a first span at a first temperature, and, then, further (second) stretching the web in a second shorter span at a second higher temperature above the first temperature, to make a novel film having surprisingly high birefringence properties.

Specifically, the invention is directed to improving birefringence in a web of polyethylene terephthalate film, during stretching, by sequentially brinding the web to various critcal temperatures and by finally second stretching it in a second shortened stretching span (the distance over which stretching occurs). By so controlling the length of this second stretching span and by stretching the web at these critical temperatures, birefringence values of the film are dramatically improved.

(2) Description of the prior art

U.S. Pat. to Pace 2,556,295 is exemplary of the prior art. It discloses a process of drawing formed structures of synthetic linear polyesters, such as nylon yarn, by drawing in two stages. The drawing is preferably accomplished so that total orientation of the amorphous structure is achieved in the primary draw followed by complete or nearly complete crystallization during the secondary draw.

U.S. Pat. 2,547,763 to Land discloses longitudinal drawing of a film over a shortened span to minimize width loss of the film and to control uniaxial orientation but does not disclose drawing in spans (and stages) of critical lengths to improve birefringence.

British Pat. 922,481 discloses improvements in the treatment of polymeric film in which crystallizable film of synthetic organic thermoplastic material that has previously been oriented by stretching in the longitudinal direction is further oriented in that direction and simultaneously heat-set in a single operation, the use of a tenter for the heat-setting being dispensed with. The two operations are effected simultaneously by continuously stretching a web of the film in the longitudinal direction, while the film is heated by heated rolls to a temperature above 150° C. and below the softening point of the film, and quenching the film before releasing the tension of stretching.

While these patents and others show orienting films and the like by stretching in stages or in shortened spans, they do not show staged stretching using a shortened span in the second stage to make a highly birefringent film, as in the instant invention.

SUMMARY OF THE INVENTION

This invention is a novel method of and apparatus for stretching film, and, more particularly, is directed to stretching a web of thermoplastic polymeric film longitudinally using two stretching steps or stages and stretching spans of critical lengths to effectively orient the web predominately in one direction to provide a film with enhanced physical properties, particularly improved birefringence.

It is known in the art to stretch shaped articles, such as films and fibers, in successive stages in which the shaped article may be reheated to the initial stretching temperature or a few degrees higher for the second stage of stretching. Following such a practice may materially alter the stretching forces with substantial reduction in stretching stress, but generally a decrease in the birefringence of the resulting product is observed, as seen, for example, in U.S. Pat. 2,823,421 to Scarlett, which shows a loss in birefringence as draw or stretching temperature is increased.

Polymers, such as polyethylene terephthalate, to be formed into film are usually melt extruded and quenched quickly to temperatures below the glass transition temperature ($T_g$) to prevent spherulitic crystallization which inhibits molecular orientation. After quenching, the substantially amorphous cast film is characterized by its instability to heat; if heated without drawing, it tends to crystallize, resulting in a strucure of lower birefringence.

Accordingly, in the method of the present invention, a substantially amorphous polyester film is first heated to a first stretching temperature at its glass transition temperature ($T_g$) or about 10° C. above that temperature and immediately stretched in a first stretching span from about one and one half to two times its initial length to partially molecularly orient the thus heated film and, then, in a second step the partially oriented, partially crystalline film is heated to a second stretching temperature and stretched in a second stretching span, shorter than the first span, whereby to complete orientation of the film and give it novel birefringence properties.

A number of teachings of the prior art disclose stretching polymeric shaped articles, such as films, fibers and fiber tows, in one or more successive stages, but none recognize the criticality of stretching the film in at least two spans, the second of which is shorter than the first, to improve birefringence of the film.

The present invention provides a critical combination of conditions of stretching by which birefringence is substantially improved. These conditions involves the two-stage stretching of the film at low, then higher, temperatures and in stretching spans of different, and critical lengths.

Although this invention will be hereinafter described with specific reference to films of polyethylene terephthalate, it should be understood that the invention is applicable to films of other organic thermoplastic polymers which are capable of being molecularly oriented by stretching. Examples of such polymers are polyethylene 1,6- and 1,5-naphthalate, polytetramethylene-1,2-dioxybenzoate, copolymers of ethylene terephthalate and ethylene isophthalate, and polycarbonates, such as from the reaction of bisphenols and phosgene.

It will be seen that such invention improves the birefringence properties of plastic film by providing a novel method of stretching in two steps or stages a web of plastic film in spans of different length to produce a film having desirable characteristics or properties capable of meeting untold numbers of use requirements.

BRIEF DESCRIPTION OF THE DRAWING

FIG. 1 is a diagrammatic view of the film orienting (stretching) apparatus of this invention showing a web of film as it moves around transfer (and heating) rolls, through first and second sets of nip rolls defining a first stretching means, through the second and a third set of nip rolls defining a second stretching means, and around other transfer rolls.

DESCRIPTION OF THE PREFERRED EMBODIMENT

This invention is a method of and apparatus for improving the physical properties of polyester film, such as polyethylene terephthalate film, by stretching, to orient it. Such stretched film is useful not only for its optical properties but also for a great variety of applications; i.e., packaging, electrical applications, protective coverings, and the like.

Referring to the drawing, there is shown an apparatus 10 of this invention for orienting by stretching (making) a web W of film, such as polyethylene terephthalate film, to provide film having enhanced physical properties.

Referring to FIG. 1 in particular, it will be seen that the web W of material to be oriented by apparatus 10 is supplied from a supply source (not shown) and moved over a support or transfer roll 20; around heating or transfer rolls 21 and 22 which form a first heating means (or a part of it); into operative association with a first stretching means including a first set of nip rolls 30 (consisting of nip rolls 31 and 32) and a second set of nip rolls 40 (consisting of nip rolls 41 and 42); into operative association with a second stretching means including the second set of nip rolls 40, which form a second heating means, and a third set of nip rolls 50 (consisting of nip rolls 51 and 52); then over support or transfer rolls 60 and 61; and, onto a windup roll (not shown).

The supply source may be any appropriate source such as a supply roll or a web of amorphous plastic film as it emerges from a polyethylene terephthalate production line, for example. As applied to polyethylene terephthalate film, the polymer is melt extruded from a slit orifice in a hopper and is cast onto an internally cooled rotating quench drum held at a temperature of about 30° C. to produce a substantially amorphous film in web form W.

Web W, substantially free of orientation and crystallization, is then passed over the heating or transfer rolls 21 and 22 to the first-stage stretching zone or means, where it is stretched at a first stretching temperature from about 72° C. to 86° C. and, thence, to the second-stage stretching zone or means where it is heated, by the nip rolls 40 to a second stretching temperature from about 91° C. to 102° C. under which conditions the second-stage stretching occurs. Optionally, for dimension stabilization, the web W may be heat set by the third set of nip rolls 50 before passing onto the windup roll.

The first set of nip rolls 30 (so-called "slow" rolls) of the first stretching means consists of the upper nip roll 31 and the lower nip roll 32 which is driven at a first speed by appropriate means (not shown), and the second set of nip rolls 40 (so-called "fast" rolls) of such first stretching means consists of the upper nip roll 41 and the lower nip roll 42 which is driven at a second speed faster than the first speed whereby to apply first stretching forces to the web W in the first stretching zone or stretching span S–1. Stretching forces in the second stretching zone or stretching span S–2 are applied in a similar manner by the second nip rolls set 40 and the third nip rolls set 50 of the second stretching means to apply second stretching forces to the web W in such second span S–2.

The slow upper driven metal roll 31, which is preferably heated, and the lower elastomeric covered roll 32 of the first nip rolls set 30 tractively engage the web W and move it at a peripheral speed substantially the same as that at which film is supplied from the heating roll 22. The heated slow roll 31 heats the web W to the first stretching temperature or maintains it at that temperature, as heated by the rolls 21 and 22.

The upper nip roll 41 preferably has a metal surface and the lower nip roll 42 an elastomeric surface and this roll 41 is driven at a peripheral speed which is greater than the speed of first rolls set 30 by a factor corresponding to the stretch ratio applied to the web W in the first stretching stage. The fast roll 41 is maintained at a temperature above the first stretching temperature to heat the web to the second stretching temperature, after stretching occurs in the span S–1 between the first and second nip rolls sets 30 and 40.

The first stretching temperature preferably is between the web's glass transition temperature and approximately 10° C. above such glass transition temperature ($T_g$) and, thus heated, the web is stretched by the first stretching means, which applies a stretching stress to the web in its direction of movement to partially orient and crystallize the web W prior to its passage into the second stretching zone.

Second-stage stretching, in the stretching span S–2, is conducted after the web W is heated to its second stretching temperature by the roll 41. Drawing or stretching tension is supplied by the combination of the second and third nip rolls sets 40 and 50, as in the first stage.

As the web W moves past and into contact with the heating roll 41, it is heated to the critical second stretching temperature which is considerably above the first stage stretching temperature, preferably in the range from 91° C. to 102° C. In the first stretching zone, it will be recalled the web was heated to only about the $T_g$ temperature of 10° C. above that temperature and that the first stretching takes place in the first span S–1. By further heating web W, it is rendered more ductile and readily deformable or stretchable and substantially all of the stretching in the second stretching step occurs in the span S–2 between the second set of nip rolls 40 and the third set of nip rolls 50. In this shortened span S–2, as will be further explained, and at this second stretching temperature, the web W may be stretched effectively to completely orient it while improving its birefringence. The stretching of the web W is brought about by the speed difference between the second and third sets of nip rolls 40 and 50 and the extent of longitudinal stretching is determined by this difference in linear speed of such rolls, in a manner known to the art.

After the plastic web W is stretched and oriented in this manner, it may then be wound onto the windup roll 21 for future use or may be further processed.

In stretching polyethylene terephthalate film in accordance with this invention, the nip roll 41 preferably is heated by any conventional means to a temperature such that it will bring the web or film as it passes therethrough to the second stretching temperature above its glass transition temperature or second order transition temperature and less than a temperature (around 87° C. for non-stretched film but 91° C. to 102° C. for film as stretched by the first stretching means) at which it would stick to the rolls 40. The contacting heating means 41 heats the film or web W to a temperature of at least over about 90° C., (i.e., to the critical second stretching temperature) and the third set of nip rolls 50, thereafter, reduce the temperature of the film or web W to below the glass transition temperature of the film, and preferably to around 20° C. The expression "glass transition temperature" or "second order transition temperature" as used in this application is that temperature at which a discontinuity occurs in the curve of a first derivative thermodynamic quality with temperature as further defined, for example, in U.S. Pat. 2,578,899 to Pace.

As stated, in the method of this invention, molten polyethylene terephthalate film is cast under conditions such that the formed film, when solid, is substantially amorphous. This is conveniently accomplished by extruding the melt at a temperature of 270° C. to 315° C. onto a casting drum maintained at a temperature sufficiently low (preferably below 60° C.) to effect rapid quenching or chilling of the polymer from the molten state such as is conventional in the art.

Preferably, this cast film, substantially free of crystallization and orientation, is then heated to the first temperature (between 72° C. to 86° C.) by the first nip rolls set 30, which rolls are heated by appropriate means, not shown. The maximum temperature to which the film may be heated by these slow nip rolls 31 and 32 (or by the rolls 20, 21) is that temperature at which the film will not stick to such heated rolls (i.e., somewhat below around 87° C. for polyethylene terephthalate film) and at which the film will stretch (i.e., the glass transition temperature of such film) to first partially orient it.

The third nip rolls set 50 is cooled by appropriate means (not shown) to bring the web W to a temperature below the glass transition temperature upon contact of the web W with such rolls. It is important to stress that these fast nip rolls 51 and 52 (one is rubber-covered; the other a steel roll) preferably perform a dual function: in contacting and gripping the web W between them, they (1) terminate the stretching at the instant the web enters the nip between such rolls and they (2) cool the web to below its glass transition temperature, and preferably around 20° C., in a preferred embodiment. This line or contact gripping by the fast nip rolls 51 and 52 provides for a definitive, unragged, termination of the shortened second stretching span S-2 and the concomitant terminating of stretching tension upon release, or exiting, of the web from the nip between these rolls, together with the simultaneous cooling by such rolls, is a unique aspect of this invention. Reduction of the temperature of the film after stretching is essential to minimizing relaxation and achieve the highest level of birefringence.

In brief summary, then, the web W as it leaves the slow rolls 30 is, and must be, at a non-sticking first stretching temperature above its glass transition temperature and is stretched in the first span S-1 at this temperature; it is then subjected to an induced temperature rise by the contacting heated roll 41 to raise its temperature to a critical second stretching temperature above the first stretching temperature and stretched in shorter second span S-2, after which it, preferably, is cooled below its glass transition temperature by the third (fast) set of nip rolls 50 which also mark the termination of stretching tension.

In the preferred embodiment of the method of this invention, there is a minimum entering film temperature, a predetermined temperature rise, and the short span S-2 is of critical length. Typical values of preferred operation are 85° C. for the first roll 31 temperature, 91° C. for the second roll 41 temperature, 20° C. for the third roll 51 temperature, a less than 8 inch span, S-2, and with a 1.5 draw ratio in first stage and a 3.6 draw ratio in second stage.

In a preferred embodiment, the ratio of the length of the first span to the second span is at least 2:1.

For the purposes of this application, the span lengths are defined as the distance from the line of emergence from engagement with the nips to the point of initial engagement with the next adjacent nips and the span is that free span between those points of emergence and engagement.

As a critical requirement for the method and apparatus of this invention, the second span length is less than the first span length. Surprisingly, it has been found by utilizing spans of these dimensions, birefringence is dramatically improved for polyethylene terephthalate film in a two-stage stretching method.

Roll 20 is essentially a transfer roll, used to direct the unoriented film path from a supply roll or continuous web produced by any one of several known methods. Small nip rolls having very small bearing force may be used to prevent film wrinkling in the preheat stage of the method. Use of the smoothing nip rolls are dependent upon film thickness and preheat roll temperature.

Rolls 21 and 22 are preferably preheat rolls used to bring the web temperature up to where cold stretching does not occur. Temperatures of such rolls range from 72° C. to 86° C., with 82° C. to 85° C. being the preferred range. Roll speeds have ranges from 4.0 y.p.m. to 12.0 y.p.m.

Roll 32 preferably operates at the same speed and temperature as the preheat rolls 21 and 22. Roll 31 is a nip roll that applies bearing force when used. However, only thicker films and low temperatures require the use of nip roll 31. An alternate method is not to use nip roll 31. In this case the angle of wrap performs the frictional function of the nip rolls.

Rolls 41 and 42 constitute the slow nip rolls of the short span S-2. Roll 42 operates at a speed greater than roll 32, preferably ranging from 1.1 to 2.0 times roll 32 speed. The temperature range is 91° C. to 102° C., with 94° to 97° being the preferred range.

Rolls 52 and 51 constitute the fast nip rolls of the short span S-2. Roll 52 preferably operates at a speed greater than rolls 32 and 42, specifically 3.0 to 5.5 times the speed of roll 42. The temperature range of roll 51 is 18° to 20° C., primarily to provide, in combination with the substantial roll wrap, a rapidly quenched and wrinkle-free film.

Rolls 60 and 61 operate at the same speed as roll 52 and act as transfer rolls only.

In stretching polyethylene terephthalate film to improve or increase orientation or birefringence, first stretching temperatures from 72° C. to 86° C. and second stretching temperatures from 91° C. to 102° C. have been successfully employed.

A highly birefringent film (0.1200 to 0.1750) made in accordance with this invention provides greater light transmittance (up to 95%) and can be used to provide glare control in windows, and also be used in place of thin mineral plates or deposited metallic crystals in light utilizing equipment.

Various techniques may be employed to measure orientation of the polyester film such as X-ray diffraction, polarized infrared absorption, swelling in water, heat shrinkage, comparison of MD (machine direction) to TD (transverse direction) physical properties such as tenacity or elongation, and measurement of birefringence. For measuring orientation of polyethylene terephthalate film, the measure of birefringence was selected. Birefringence is a dimensionless number of is a direct measure of the difference of the refractive indices of the film parallel to and perpendicular to the axis of orientation. When a birefringent film such as orientated polyethylene terephthalate transmits a beam of plane polarized light which strikes perpendicular to the axis of orientation (normal to the plane of the sheet, for example), the line is split into two beams polarized at right angles to each other, one of which travels faster than the other. The distance that one of these beams is ahead of the other when they emerge from the film is known as the retardation of the sample (usually expressed in millimicrons) and is related to the film thickness and to birefringence $\Delta_n$, by the equation, Retardation = thickness × birefringence Thickness can be measured readily, and retardation is measured by means of a compensator such as a calibrated quartz wedge, It is seen that there are three critical elements of the present invention: (1) the web initially must be substantially amorphous, (2) it must initially be drawn or stretched in a first stretching span at a low first stretching temperature consistent with molecular orientation, and, thereafter, (3) it must be heated to a stretching temperature higher than in the first stretching temperature and stretched in a second stretching span shorter than the first stretching span to further stretch and molecularly orient the web. The key step or element is the staged stretching, at critical temperatures, using the second shorter stretching span.

Hence, there is provided a method of continuously stretching a web of polyethylene terephthalate film including the steps of:

moving an unstretched web of such film, substantially free of orientation and crystallization, into the nip of a first set of nip rolls, then into the nip of a second set of nip rolls and, thereafter, into the nip of a third set of nip rolls;

heating the web to a first stretching temperature, then to a second stretching temperature; and stretching the web in first and second spans of different to orient it.

This method further includes the step of quenching the web below the glass transition temperature of the web by means of the third set of nip rolls.

It will be recognized, by one skilled in the art, that the precise conditions employed in practicing this invention may vary and still be within the scope of the invention.

I claim:

1. A method of orienting a web of polyethylene terephthalate film including the steps of:

moving a web of such film, substantially free of orientation and crystallization, into the nip of a first set of nip rolls;

heating the web to a first stretching temperature of from 72° C. to 86° C. prior to the exiting of the web from the first set of nip rolls;

moving the web from the first set of nip rolls into a second set of nip rolls, the first set of nip rolls being driven at a first speed and the second set of nip rolls being driven at a second speed faster than the first speed whereby to apply first stretching forces to the web;

first stretching the web in its direction of movement in a first span between and defined by the first set of nip rolls and the second set of nip rolls;

heating the web to a second stretching temperature of from 91° C. to 102° C. prior to the exiting of the web from the second set of nip rolls;

immediately thereafter moving the web from the second set of nip rolls into a third set of nip rolls, the third set of nip rolls being driven at a third speed faster than the second speed whereby to apply second stretching forces to the web;

second stretching the web in its direction of movement in a second span between and defined by the second set of nip rolls and the third set of nip rolls;

the length of the second span being less than the length of the first span and wherein the ratio of the length of the first span to the second span is at least 2:1 and the length of the second span being 8 inches or less; and wherein the web is stretched from 1.1 to 2.0 times its unstretched length in the first span and is stretched from 3.0 to 5.5 times its first streched length in the second span.

2. The method of claim 1 wherein the first stretching temperature is from 82° C. to 85° C. and the second stretching temperature is from 94° C. to 97° C.

3. The method of claim 1 including the step of quenching the web below the glass transition temperature of the web by means of the third set of nip rolls.

4. The method of claim 3 wherein the third set of nip rolls are at a third temperature from 18° C. to 20° C. whereby to quench the web.

References Cited

UNITED STATES PATENTS

| 2,823,421 | 2/1958 | Scarlett | 264—289 |
| 3,102,323 | 9/1963 | Adams | 260—40 |
| 3,117,173 | 1/1964 | Adams | 264—210 F |
| 3,256,379 | 1/1966 | Heffelfinger | 264—289 |
| 3,088,173 | 5/1963 | Jones | 264—289 |
| 3,379,809 | 4/1968 | Woods | 264—290 T UX |
| 3,400,192 | 9/1968 | Hartmann | 264—288 |
| 2,556,295 | 6/1951 | Pace, Jr. | 264—289 X |
| 2,547,763 | 4/1951 | Land et al. | 264—288 |

FOREIGN PATENTS

| 922,481 | 4/1963 | Great Britain | 264—288 |
| 1,070,055 | 5/1967 | Great Britain | 264—288 |

DONALD J. ARNOLD, Primary Examiner

J. B. LOWE, Assistant Examiner

U.S. Cl. X.R.

264—237, 348, DIG. 73